Figure 6:
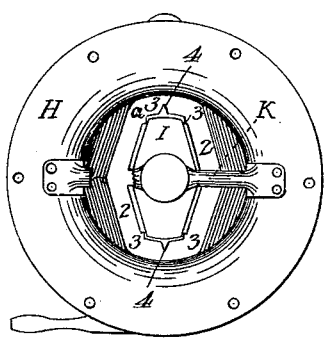

(No Model.) 2 Sheets—Sheet 1.
J. FRANCY.
MACHINE FOR MANUFACTURING WALL COPING.
No. 371,574. Patented Oct. 18, 1887.
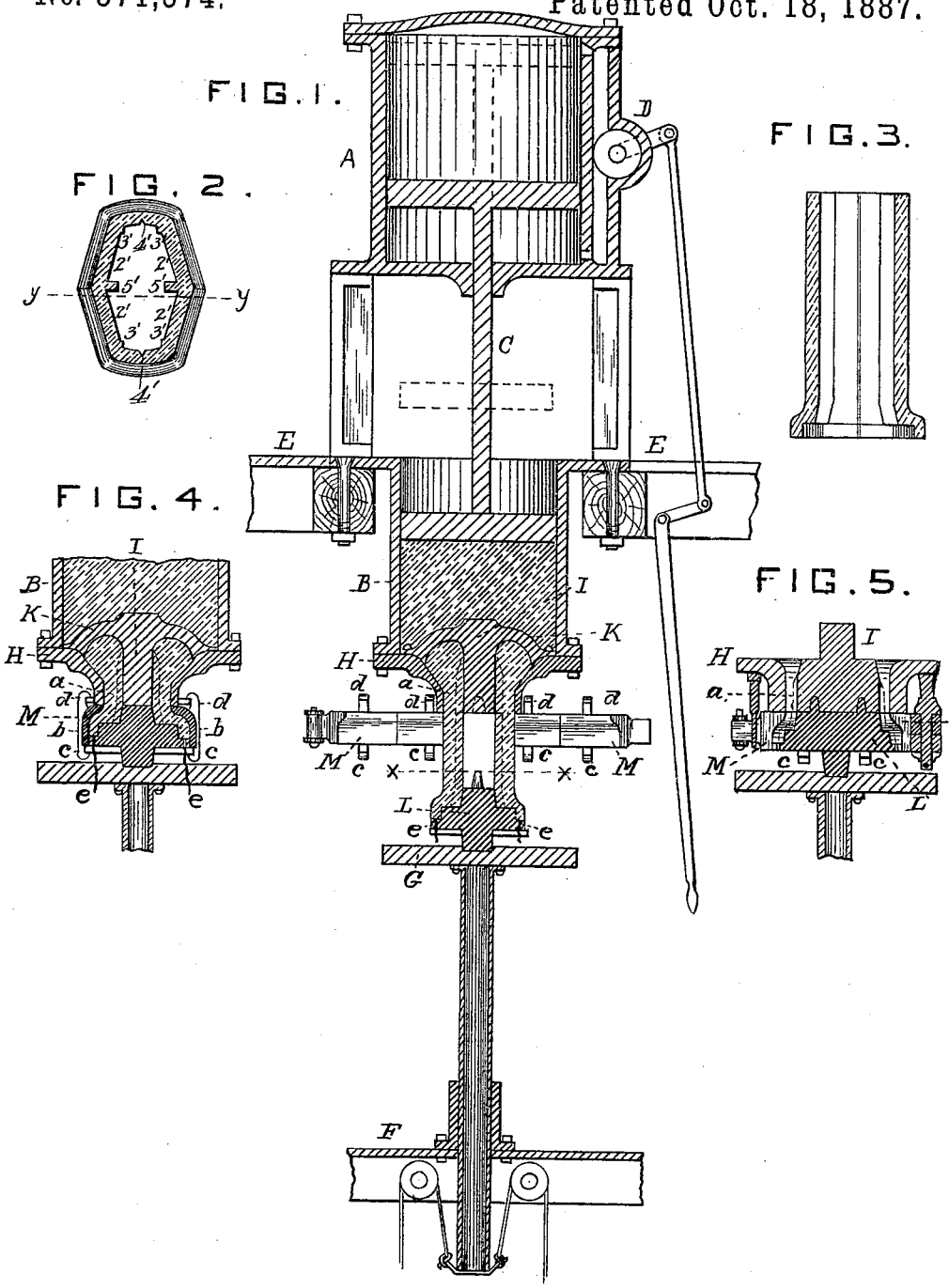
WITNESSES:
A. G. Morey
T. R. Rathbone
INVENTOR
John Francy
BY G. L. Chapin
ATTORNEY (No Model.) 2 Sheets—Sheet 2.

J. FRANCY.
MACHINE FOR MANUFACTURING WALL COPING.

No. 371,574. Patented Oct. 18, 1887.

WITNESSES:
A. G. Morey
F. R. Pattison

INVENTOR
John Francy
BY G. L. Chapin
ATTORNEY

UNITED STATES PATENT OFFICE.

JOHN FRANCY, OF TORONTO, OHIO, ASSIGNOR OF ONE-HALF TO PETER B. WIGHT, OF CHICAGO, ILLINOIS.

MACHINE FOR MANUFACTURING WALL-COPING.

SPECIFICATION forming part of Letters Patent No. 371,574, dated October 18, 1887.

Application filed October 25, 1886. Serial No. 217,088. (No model.)

*To all whom it may concern:*

Be it known that I, JOHN FRANCY, a citizen of the United States, residing at Toronto, in the county of Jefferson and State of Ohio, have invented certain new and useful Improvements in the Manufacture of Wall-Coping; and I do hereby declare the following to be a full, clear, and exact description of the same.

My invention has special reference to the construction of dies for manufacturing wall-coping in any desired sectional lengths, having enlarged sockets or overlapping parts at one end, by pressing the same through dies without rotation attached to a steam-power press such as is generally used for the manufacture of sewer-pipe; and it is an improvement on my invention patented to me March 10, 1885, No. 313,583, but differs from it in that in the patent clay is plastered onto a central core, which gives form to the interior part of the coping, and hinged exterior clamp-sections, which are closed to give form to the exterior of the coping, and in that the molds will only make one length of coping, and that without a socket or overlap.

The main part of the invention is the die through which the coping is expressed, with its several attachments, the material of the coping being wet clay tempered to the proper consistency to run through the said die with a pressure of from eighty to one hundred pounds of steam in the steam-cylinder and a much greater pressure in the clay-cylinder, according to the kind of clay used. The special feature of the die which is novel is its capacity to form the sockets at one end of such coping-tiles as, when set on a wall, have at their top and edges overlapping joints. This is done by forcing clay into the receptacles made by assembling its movable and detachable attachments and then disengaging such parts after the socket ends are formed, so that the main part of the coping may be run out freely through the die until the required length of coping is made. When the desired length is obtained, the same being anywhere from six inches to three feet, the clay is cut off with a wire close up to the opening in the die, which completes the manufacture of one double piece of coping in the wet state. The attachable and detachable parts being brought back into place, the process is repeated again for each length of coping required.

My invention is confined to forming copings in the wet clay. The subsequent manufacturing processes after the coping is run out are the same as those applied to the manufacture of sewer-pipes.

It is well known that the sockets of sewer-pipes, when made by steam-power, are formed by pressing the pipes through dies having enlarged bell-shaped formations below the point through which the wet clay is expressed and forming part of the die itself. What is known in the arts as a "former" is also used to give the outline to the interior of the socket. The former is attached to and detached from the die by a mechanical arrangement which makes it necessary to revolve it on its axis, it being circular. This is admissible only in the manufacture of circular pipes. In such manufacture, also, the clay, after being shaped and run off to the required length, is cut off by a knife revolving within the die; but these appliances are not practicable in the manufacture of wall-coping, which, when two pieces are made simultaneously, must be of the form of a rectangular or hexagonal box, or some form that will admit of its being split into two halves practicable for use in setting properly on a wall and protecting it from the weather. The sections of wall-coping can only be cut off with a stiff wire close up to the opening in the die after the arms or jaws, to be hereinafter described, have been opened. For this reason I have made that part of the die which forms the exterior of the socket part of the coping movable and in two parts hinged at a common point. The former in my die is detachable, but does not revolve. I have four or more lugs on the exterior of my jaws, on which, when the jaws are closed, the lower parts of the lugs lap over the projections on the bottom of the former, and at the same time the upper parts of the lugs lap over projections on the exterior sides of the die, so that when the clay is being forced down from the cylinder through the die the pressure on the former is withstood by the lugs which attach it directly to the exterior wall of the die.

The jaws at their free ends are also secured in place to resist the pressure by other mechanical devices which are in common use in analogous mechanism.

To enable others skilled in the art to which my invention appertains to make and use the same, I hereby declare the following to be a full, clear, and exact description, reference being had to the annexed drawings, (two sheets,) forming a part of this specification, on which the same letters represent the same parts on the different figures.

Figure 7:
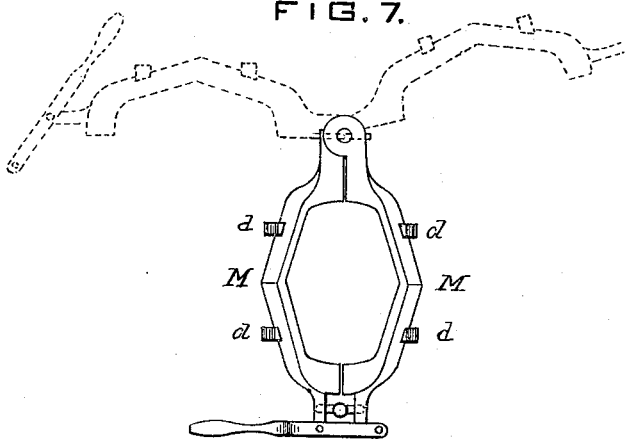
Figure 8:
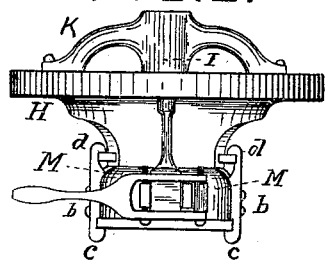
Figure 9:
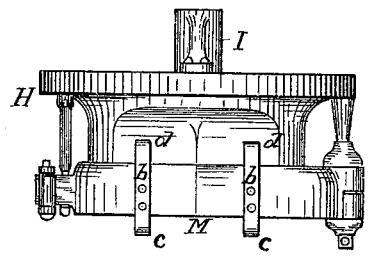
Figure 10:
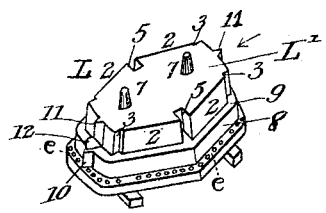
Figure 11:
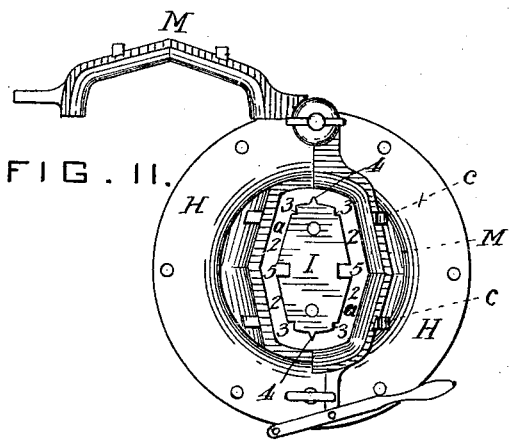

Figure 1, Sheet 1, is a vertical transverse section of a vertical steam clay-press with my die attached for forming lap-joint wall-coping, the parts being in position as when a length of coping has been formed but has not yet been cut off from the clay in the die. Fig. 2 is an enlarged transverse section and plan view of a piece of coping formed thereby, taken on dotted line X X, Fig. 1, looking down. Fig. 3 is a vertical section and elevation of the same, taken on line Y Y, Fig. 2. Fig. 4 is a transverse vertical section of the die and former, the parts being in position as when the socket on the coping is being formed. Fig. 5 is a longitudinal vertical section of the same, the parts being in the same position as in Fig. 4. Fig. 6, Sheet 2, is an enlarged plan view of the die removed from the press and seen from above. Fig. 7 is an enlarged plan of the arms or jaws which form the outer contour of the socket, detached from the die and seen from above. Fig. 8 is an enlarged end elevation of the die and former detached from the press, the jaws being closed. Fig. 9 is an enlarged side elevation of the same. Fig. 10 is a perspective view of the former removed from the other parts; and Fig. 11 is an inverted plan view of the die, one jaw being shown open.

On Fig. 1, Sheet 1, A is the steam cylinder, B is the clay-cylinder, C is the piston-rod, and D is the valve mechanism, (to be operated by a lever in the room below,) of a clay-press. E E is the floor of the clay-room. The pistons are represented in the position as when the clay is being forced down in the clay-cylinder and out through the die. The dotted lines show the pistons in the position as when they are raised so as to allow the clay-cylinder to be filled from the clay-floor.

F F is the floor of the working-room, and G G is a counterbalanced table moving vertically, so as to receive the former and the coping-sections as they are expressed from the die.

On Figs. 1, 4, and 5, Sheet 1, and Figs. 6, 8, 9, and 11, Sheet 2, H H represent the main part or exterior shell of the die, which will for convenience be called "the die;" but in the arts the shell of the die, the core or bell, the former, and the clamp sections or jaws taken together are called "a die." The die is attached to the bottom of the clay-cylinder by bolts and is removable at pleasure. I is the core or bell, which is placed in the center of the die, its lower surface being flush with the opening thereof, and it is supported firmly in its proper position by its two arms, K, attached to the interior of the die and called "the bridge." The space $a$ between the core and the die is the exact section of the main body of the coping, as shown in Fig. 2.

The former shown in perspective in Fig. 10 is also shown in section at L in Figs. 1, 4, and 5, Sheet 1, and in plan and elevation in Figs. 7, 8, 9, and 11, Sheet 2.

The special construction of the core or bell I is more clearly shown at Figs. 6, 10, and 11, and it is formed with double-tapered sides 2 2 2 2 and inwardly-projecting notches 3 3 3 3, which form the interior seats, 3' 3' 3' 3', Fig. 2, to support the sections of coping on a wall, and when very wide coping is made notches 5 5 are formed in the sides, which fill with clay and form central supports to the coping, as shown at 5' 5', Fig. 2. The bell has also formed on its vertical ends V-shaped projections 4 4, which lessen the thickness of clay, so that the double section may be readily severed after being burned.

The top portion, L', of the former L, Fig. 10, has precisely the same horizontal section as the bell I has, so that when the part L' is brought up in contact with the bell I and properly centered by the dowels 7 7 it forms a portion of the bell or core, and it is provided with V-shaped projections 11 on its vertical ends coinciding with the V-shaped projections 4 on the bell I. This is an important feature in the construction, and is essential in preventing the clay forming the socket from being broken from the clay forming the body of the coping at the start of the running-out process.

The enlarged part 8 9 of the former gives shape to the interior of the socket of the coping, and the ends of said part each are provided with projections 10 12, that the double-section coping may be severed in lines having the same plane.

The process of making a length of coping is as follows: The die H H, with its several attachments, consisting of the core or bell, the former, and the arms or jaws, is firmly secured to the bottom of the clay-cylinder by bolts. The pistons of the steam and clay cylinders are raised by steam-pressure, so that the clay-piston is above the clay-floor E E. The clay-cylinder is filled with wet clay. The former is placed on the moving table G G and raised until it comes in contact with the core or bell I, where it is brought to its true position by two or more dowels of conical form. The arms or jaws M M, which are pivoted at one end, are brought together and clamped at the opposite end by means of a well-known mechanical device operated by a lever. Attached to the exterior of the arms are vertical lugs $b$, with hooked ends $c$ at the bottom and $d$ at the top. The ends $c$ hook over projections at the sides of the former, and at the same time the ends $d$ hook over projections on the exterior surface of the die, thus securing the former and jaws directly to the die by a simultaneous operation. The whole die is then in the position shown at Figs. 4 and 5, Sheet 1, and Figs. 8 and 9, Sheet 2. Steam-pressure being then brought upon the clay-piston, the clay is forced down through the space $a$, so as to completely fill the space between the arms and the former, and makes the overlapping or socket part of the coping. Any air that may be contained in the clay is forced out through a number of small holes, $e$, in the lower part of the former, which makes the bottom edge of the coping-sections, and the complete expulsion of air is indicated by the appearance of small pencils of clay following the air. In Fig. 4, Sheet 1, the formation of the socket end is shown as just described. The steam-pressure is then cut off. The arms are thrown wide open, as shown at Fig. 1, Sheet 1, and steam-pressure is again put on, and the compressed clay is again forced through the opening $a$, taking the form of that opening and pushing downward the former L and the table G G, on which it rests. When the requisite length of coping has been thus obtained, the steam-pressure is cut off, and the material forming two sections of coping thus run out is cut off at the mouth of the die by a stiff wire. The table is then pushed down by hand, and a completed double piece of coping with socket at the lower end has now been formed. It is then lifted from the former by hand, the various attachments to the die are brought together, and the same process repeated for each length that is to be made.

What I claim as new, and desire to secure by Letters Patent, is—

The lugs $b$, with the hooks $d$, lapping over projections on the exterior sides of the die H, and hooks $c$, lapping over projections on the former L, in combination with the arms or jaws M and the die H H, for the purpose of securing the former and jaws to the die, substantially as above set forth.

JOHN FRANCY.

Witnesses:
J. H. PRISBY,
FRANK HARTFORD.